United States Patent
Kim

(10) Patent No.: US 7,195,249 B2
(45) Date of Patent: Mar. 27, 2007

(54) METHOD OF CONTROLLING ACTUATOR ASSEMBLY

(75) Inventor: Young-Kwang Kim, Kyunggi-do (KR)

(73) Assignee: Hyundai Mobis Co., Ltd., Kyunggi-Do (KR)

( * ) Notice: Subject to any disclaimer, the term of this patent is extended or adjusted under 35 U.S.C. 154(b) by 96 days.

(21) Appl. No.: 11/008,238

(22) Filed: Dec. 10, 2004

(65) Prior Publication Data

US 2006/0071439 A1    Apr. 6, 2006

(30) Foreign Application Priority Data

Oct. 6, 2004    (JP)    ............. 10-2004-0079457

(51) Int. Cl.
*B60G 17/015*    (2006.01)

(52) U.S. Cl. ............ 280/5.51; 280/5.521; 280/5.522; 280/5.506; 701/38

(58) Field of Classification Search ............ 280/5.51, 280/5.511, 5.512, 5.52, 5.521, 5.522, 86.751, 280/86.757, 86.758; 701/38
See application file for complete search history.

(56) References Cited

U.S. PATENT DOCUMENTS

| 4,835,714 | A | | 5/1989 | Sano et al. | |
|---|---|---|---|---|---|
| 4,895,383 | A | * | 1/1990 | Abe et al. | 180/415 |
| 5,700,025 | A | * | 12/1997 | Lee | 280/86.751 |
| 5,893,041 | A | * | 4/1999 | Shibata et al. | 701/38 |
| 6,097,999 | A | * | 8/2000 | Shal et al. | 701/38 |
| 6,347,802 | B1 | * | 2/2002 | Mackle et al. | 280/5.521 |
| 6,439,582 | B1 | * | 8/2002 | Burdock | 280/5.506 |
| 6,813,552 | B2 | * | 11/2004 | Ghoneim et al. | 701/70 |
| 6,962,355 | B2 | * | 11/2005 | Kwon | 280/86.75 |

FOREIGN PATENT DOCUMENTS

KR    2003-0017668    4/2003

OTHER PUBLICATIONS

U.S. Appl. No. 11/012,250, filed Dec. 16, 2004.
U.S. Appl. No. 10/997,929, filed Nov. 29, 2004.

* cited by examiner

*Primary Examiner*—Paul N. Dickson
*Assistant Examiner*—Tiffany L. Webb
(74) *Attorney, Agent, or Firm*—Greenblum & Bernstein, P.L.C.

(57) ABSTRACT

The present invention provides a method of controlling an actuator assembly for suspension systems. The actuator assembly control method of the present invention is possible to control the actuator assembly according to conditions of vehicle velocity and steering angle or vehicle velocity and steering angular velocity, thus reducing energy consumption, thereby increasing the efficiency of the actuator assembly.

6 Claims, 4 Drawing Sheets

FIG. 1           PRIOR ART
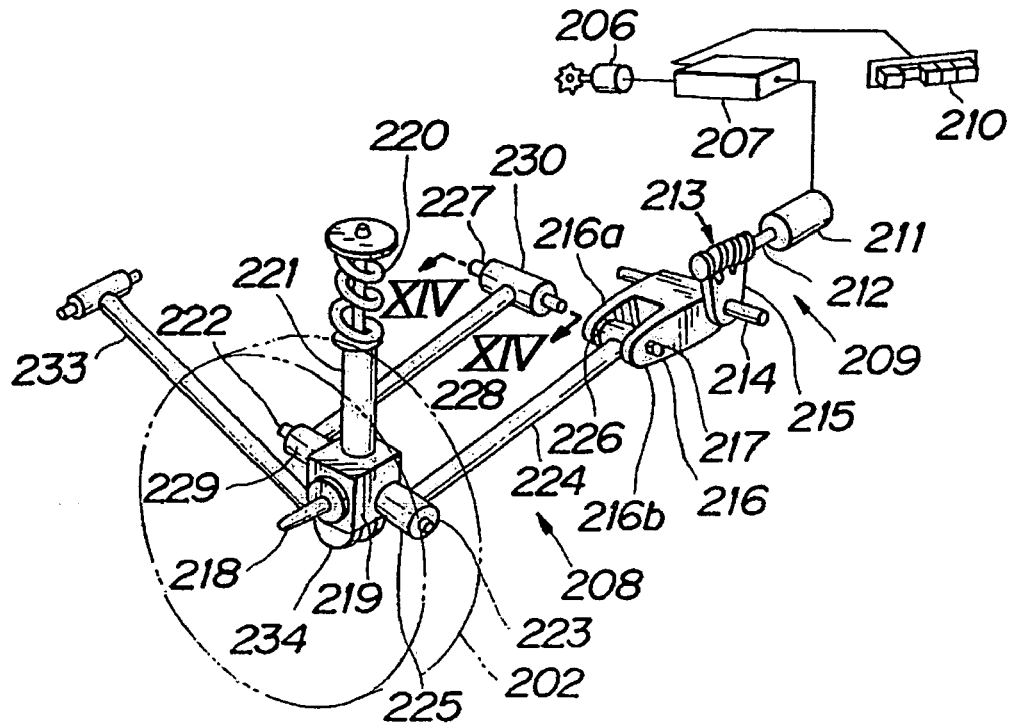
FIG. 2
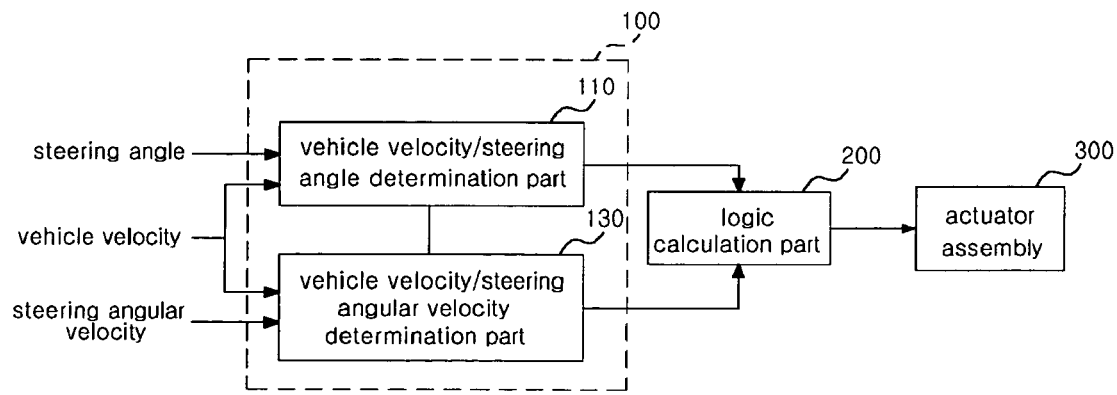

METHOD OF CONTROLLING ACTUATOR ASSEMBLY

RELATED APPLICATIONS

The present disclosure relates to subject matter contained in priority Korean Application No. 10-2004-0079457, filed on Oct. 6, 2004, which is herein expressly incorporated by reference in its entirety.

BACKGROUND OF THE INVENTION

1. Field of the Invention

The present invention relates generally to methods of controlling actuator assemblies and, more particularly, to an actuator assembly control method which is able to control the actuator assembly according to conditions of vehicle velocity and a steering angle or the vehicle velocity and a steering angular velocity, thus reducing energy consumption, thereby increasing the efficiency of the actuator assembly.

2. Description of the Related Art

As well known to those skilled in the art, a suspension system must satisfy basic requirements of providing controllability and stability of a vehicle when turning, braking and driving. Positioning of wheels according to suspension geometry serves as a very important factor to satisfy these basic terms. Particularly, camber and toe largely affect stability of the vehicle when turning and driving straight. This is intimately associated with roll of the vehicle body.

Actuator assemblies for suspension systems, which are capable of appropriately controlling camber and toe according to the driving conditions of the vehicle, were proposed in Korean Laid-open Publication No. 2003-0017668 and U.S. Pat. No. 4,835,714.

FIG. 1 is a perspective view showing the conventional actuator assembly for suspension systems of U.S. Pat. No. 4,835,714. As shown in FIG. 1, in the actuator assembly of U.S. Pat. No. 4,835,714, an actuator 209 has a hinge shaft 209 which is coupled to a sub-frame by a hinge, and two gears 213 and 215 to be driven by a motor 211. A rod 224 is rotatably coupled at a first end thereof to the actuator 209. A knuckle 219 is rotatably coupled to a second end of the rod 224. The operation of the actuator assembly having the above-mentioned construction is as follows. When the motor 211 of the actuator 209 is driven, the gears 213 and 215 are rotated. Then, the hinge shaft 214 rotates in a predetermined direction. The rotation of the hinge shaft 214 is converted into a linear motion of the rod 224. Then, the reference length of the knuckle 219 coupled to the rod 224 is changed. As a result, the knuckle 219 is rotated, so that a toe angle is changed.

However, the above-mentioned actuator assembly for suspension systems has the following problems.

When considering the geometry, the change in the toe angle by the operation of the actuator assembly is effective only when bump of the wheels occurs. Otherwise, when bump of the wheels does not occur, although the actuator is operated, the toe angle is not changed. Therefore, the conventional actuator assembly is problematic in that energy consumption occurs due to pointless operation of the actuator.

SUMMARY OF THE INVENTION

Accordingly, the present invention has been made keeping in mind the above problems occurring in the prior art, and an object of the present invention is to provide an actuator assembly control method which is possible to control the actuator assembly according to conditions of vehicle velocity and a steering angle or the vehicle velocity and a steering angular velocity, thus reducing energy consumption, thereby increasing the efficiency of the actuator assembly.

Another object of the present invention is to provide an actuator assembly control method which prevents an inconsistent sensation resulting from excessive variability of the vehicle geometry.

In an aspect, the present invention provides a method of controlling an actuator assembly, including: obtaining both vehicle velocity and a steering angle; determining whether both the input vehicle velocity and steering angle are in a preset advancing operation or retracting operation range; advancing the actuator assembly when both the vehicle velocity and the steering angle are in the preset advancing operation range; and retracting the actuator assembly when both the vehicle velocity and the steering angle are in the preset retracting operation range. The actuator assembly is set such that the actuator assembly retracting operation speed is slower than the actuator assembly advancing operation speed.

Therefore, the actuator assembly control method of the present invention prevents an inconsistent sensation from occurring due to excessive variability of the vehicle geometry.

Furthermore, despite a large steering angle, if the vehicle velocity is low, the vehicle bump is prevented from occurring. Conversely, despite the high vehicle velocity, if the steering angle is small, the vehicle bump is prevented from occurring. In other words, the actuator assembly can be appropriately operated according to the driving state of the vehicle, thus reducing energy consumption, thereby increasing the efficiency of the actuator assembly.

The actuator assembly may be set such that the actuator assembly retracting operation speed is maintained at a constant value. Then, a stroke of the actuator assembly is linearly reduced as a function of time.

Obtaining both the vehicle velocity and the steering angle may include obtaining a steering angular velocity of the vehicle. The actuator assembly control method may further include determining whether both the input vehicle velocity and the steering angular velocity are in the preset advancing operation range. Therefore, although the vehicle velocity is high and a desired steering angle is large, if a driver slowly steers the vehicle to cause a change in the direction, the vehicle makes a large turn. In this case, the large vehicle bump is prevented from occurring. In the present invention, in consideration of even this condition, the actuator assembly is operated.

The determination of the vehicle velocity and the steering angle and the determination of the vehicle velocity and the steering angular velocity may be performed by an AND logic. Thus, the conditions for controlling both the set of vehicle velocity and steering angle and the set of vehicle velocity and steering angular velocity can be simultaneously determined. Therefore, the actuator assembly is appropriately operated according to the control conditions.

In another aspect, the present invention provides an actuator lever of an actuator assembly, including: a body part having a shaft hole into which a hinge shaft is inserted; a yoke part coupled to an actuator and provided on the body part while extending in a direction perpendicular to the body part; and a bush mounting part extending from the body part in a direction equal to a direction of the shaft hole formed in the body part, so that a mounting bush of a support link is mounted to the bush mounting part.

In the actuator lever of the present invention having the above-mentioned construction, a distance between the hinge shaft and the mounting bush is relatively short. Therefore, rotational inertia mass is reduced, so that responsibility of the actuator is superior. As a result, prompt control of the actuator assembly is possible.

Furthermore, the bush mounting part does not limit the length of the support link. Accordingly, the design of the actuator lever of the present invention is not limited.

BRIEF DESCRIPTION OF THE DRAWINGS

The above and other objects, features and advantages of the present invention will be more clearly understood from the following detailed description taken in conjunction with the accompanying drawings, in which:

FIG. 1 is a perspective view showing a conventional actuator assembly of a suspension system;

FIG. 2 is a block diagram of an actuator assembly, according to a preferred embodiment of the present invention;

DESCRIPTION OF THE PREFERRED EMBODIMENTS

Hereinafter, embodiments of the present invention will be described in detail with reference to the attached drawings.

For reference, in a preferred embodiment of the present invention, components the same as or similar to conventional arts will be easily understood by referring to the above-mentioned conventional art, therefore further explanation is deemed unnecessary.

Figure 3:
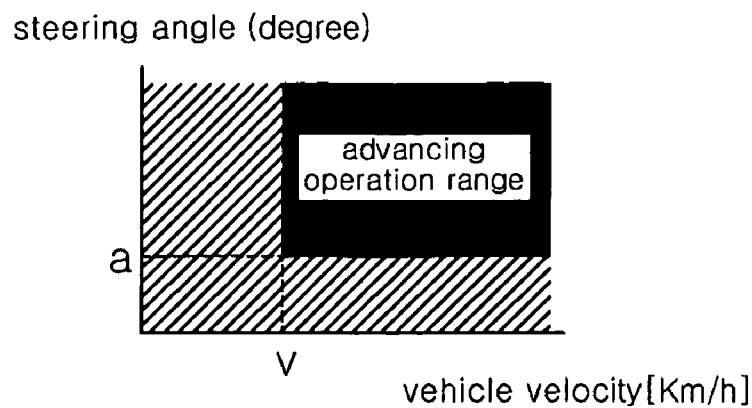
FIG. 3 is a graph showing an advancing operation range of the actuator assembly which is preset in a vehicle velocity and steering angle determination part of FIG. 2.
Figure 4:
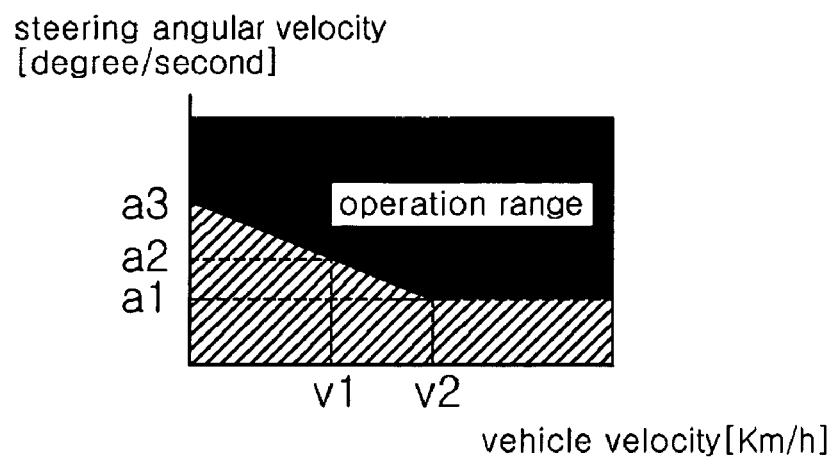
FIG. 4 is a graph showing an advancing operation range of the actuator assembly which is preset in a vehicle velocity and steering angular velocity determination part of FIG. 2.
Figure 5:
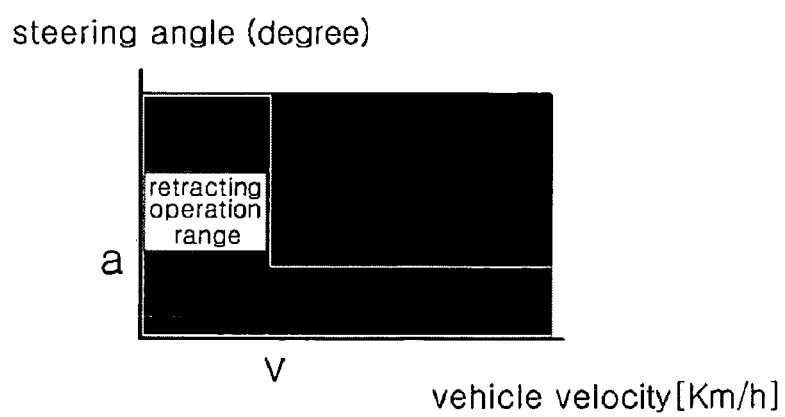
FIG. 5 is a graph showing a retracting operation range of the actuator assembly which is preset in the vehicle velocity and steering angle determination part of FIG. 2.
Figure 6A:
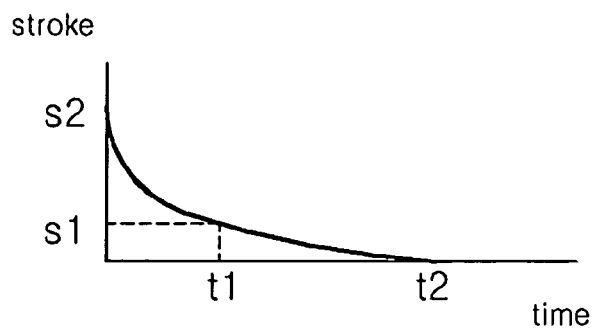
FIGS. 6a and 6b are graphs showing a retracting velocity of the actuator assembly according to the present invention.
Figure 6B:
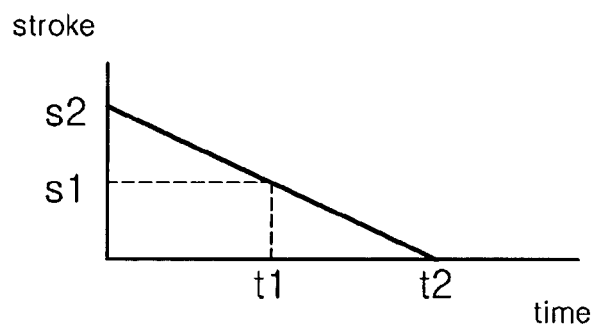
Figure 7:
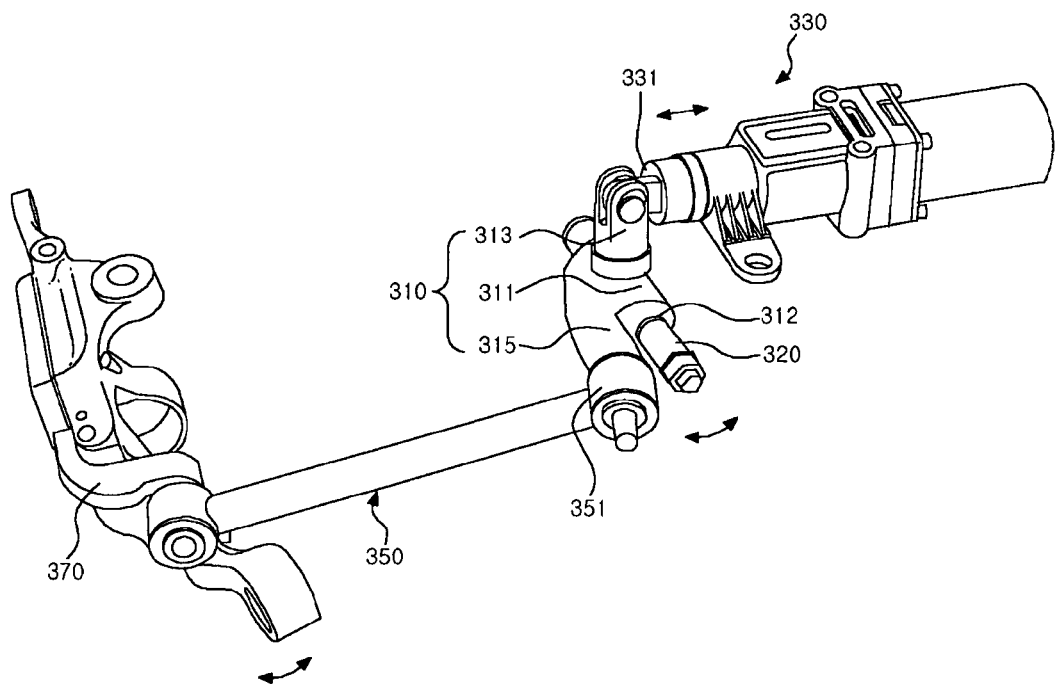
FIG. 7 is a perspective view showing the actuator assembly according to the present invention.
Figure 8:
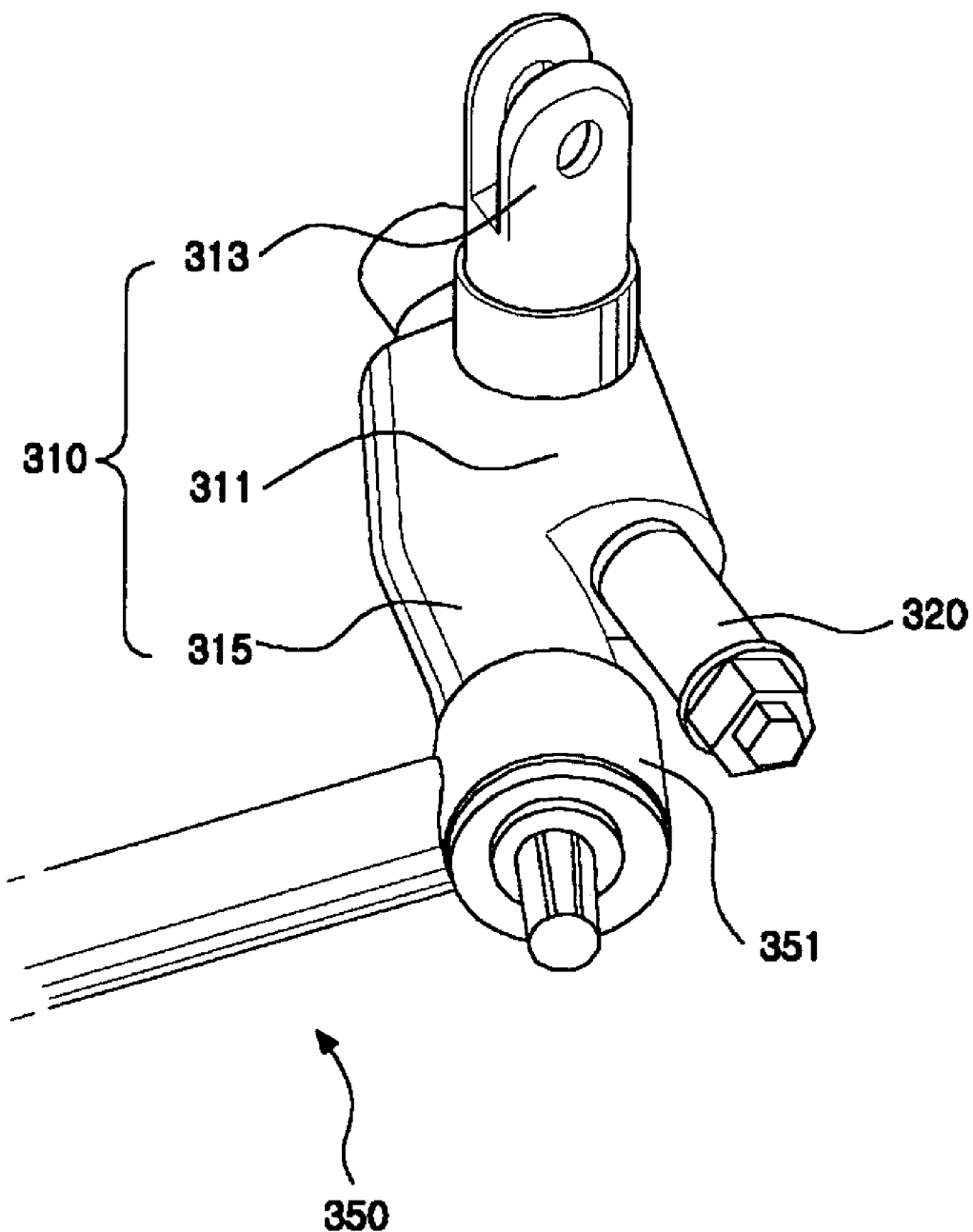
FIG. 8 is a perspective view showing an enlargement of a lever of the actuator assembly of FIG. 7.

FIG. 2 is a block diagram of an actuator assembly 300, according to a preferred embodiment of the present invention. FIG. 3 is a graph showing an advancing operation range of the actuator assembly 300 which is preset in a vehicle velocity and steering angle determination part 110 of FIG. 2. FIG. 4 is a graph showing an advancing operation range of the actuator assembly 300 which is preset in a vehicle velocity and steering angular velocity determination part 130 of FIG. 2. FIG. 5 is a graph showing a retracting operation range of the actuator assembly 300 which is preset in the vehicle velocity and steering angle determination part 110 of FIG. 2. FIGS. 6a and 6b are graphs showing a retracting velocity of the actuator assembly according to the present invention. FIG. 7 is a perspective view showing the actuator assembly 300 according to the present invention, in which an actuator lever 310 is provided between an actuator 330 and a support link 350. FIG. 8 is a perspective view showing an enlargement of the actuator lever 310 of the actuator assembly 300 of FIG. 7.

As shown in FIG. 2, a method of controlling an actuator assembly 300 according to the preferred embodiment of the present invention includes a step of obtaining both vehicle velocity and a steering angle, and a step of determining whether both the input vehicle velocity and steering angle are in a preset advancing operation or retracting operation range. The actuator assembly control method further includes a step of advancing the actuator assembly 300 when both the vehicle velocity and the steering angle are in the preset advancing operation range, and a step of retracting the actuator assembly 300 when both the vehicle velocity and the steering angle are in the preset retracting operation range.

First the step of obtaining the vehicle velocity and steering angle is executed.

Thereafter, at the step of determination of the vehicle velocity and steering angle, the vehicle velocity and steering angle determination part 110 of a control part 100 determines whether the input vehicle velocity and steering angle are in the preset advancing operation or returning operation range.

In this step, as shown in FIG. 3, the advancing operation range for the advancing operation of the actuator assembly 300 is preferably preset such that the actuator assembly 300 is advanced when vehicle velocity is higher than a reference vehicle velocity value (v), and a steering angle is higher than a reference steering angle value (a).

On the other hand, as shown in FIG. 5, the retracting operation range for the retracting operation of the actuator assembly 300 is preferably preset such that the actuator assembly 300 is retracted when the vehicle velocity is lower than the reference vehicle velocity value (v), and the steering angle is lower than a reference steering angle value (a). That is, the graph of the retracting operation logic is the same as that of the advancing operation logic. Preferably, the actuator assembly 300 is set such that the actuator assembly retracting operation speed is slower than the actuator assembly advancing operation speed.

The retracting operation of the actuator assembly 300, which has been in a toe-in setting during a tuning movement of the vehicle, is executed before a straight driving state of the vehicle. In such a transition state, if the geometry (toe-in) of the vehicle is excessively variable, an inconsistent sensation results. To prevent the inconsistent sensation from resulting, the actuator assembly 300 is slowly retracted, unlike the advancing operation logic.

Here, if the actuator assembly 300 is retracted by only a reduction of a gain of a controller provided in the control part 100, the stroke of the actuator assembly 300 is exponentially reduced as a function of time, as shown in FIG. 6a. Then, although a completion of the retracting operation of the actuator assembly 300 takes an appropriate time (t2), the actuator assembly 300 has already been in a state (s1), in which the stroke is retracted to half of the total stroke or more, in an early state, that is, at a time (t1). Therefore, some problems may occur.

To prevent this event, preferably, the stroke of the actuator assembly 300 is linearly reduced as a function of time, as shown in FIG. 6b. In other words, the actuator assembly 300 is set such that the actuator assembly retracting operation speed is maintained at a constant value.

At the step of advancing the actuator assembly 300, according to the result of the step of determination of the vehicle velocity and the steering angle, when both the vehicle velocity and the steering angle are in the preset advancing operation range, the actuator assembly 300 is advanced.

On the contrary, at the step of retracting the actuator assembly 300, according to the result of the step of determination of the vehicle velocity and the steering angle, when both the vehicle velocity and the steering angle are in the preset retracting operation range, the actuator assembly 300 is retracted.

As such, in the present invention, the actuator assembly 300 is operated according to the desired conditions after obtaining the vehicle velocity and the steering angle. Accordingly, despite the large steering angle, if the vehicle velocity is low, the vehicle bump is prevented from occurring. Furthermore, despite the high vehicle velocity, if the steering angle is small, the vehicle bump is prevented from occurring. In other words, the actuator assembly 300 can be appropriately operated according to the driving state of the vehicle, thus reducing energy consumption, thereby increasing the efficiency of the actuator assembly 300.

Preferably, in the present invention, at the step of obtaining both the vehicle velocity and the steering angle, a steering angular velocity of the vehicle is obtained. The actuator assembly control method of the present invention further includes a step of determining whether both the input vehicle velocity and the steering angular velocity are in the preset advancing operation range.

At the step of determination of the vehicle velocity and the steering angular velocity, the vehicle velocity and steering angular velocity determination part 130 of the control part 100 determines whether both the input vehicle velocity and the steering angular velocity are in the preset advancing operation range.

In detail, the vehicle velocity and steering angular velocity determination part 130 is set such that the actuator assembly 300 is advanced when the input vehicle velocity and steering angular velocity are equal to or higher than preset boundary values, as shown in FIG. 4. Preferably, it is preset such that the reference steering angular velocity values are changed as the vehicle velocity, but when the vehicle velocity is equal to or higher than a predetermined velocity (v2), the reference steering angular velocity value is maintained at a predetermined constant value (a1).

As such, in the present invention, after comparing the obtained vehicle velocity and steering angular velocity with the preset control conditions, the actuator assembly 300 is operated according to the preset actuating process. Therefore, although the vehicle velocity is high and a desired steering angle is large, if a driver slowly steers the vehicle for a change in direction, the vehicle makes a large turn. In this case, the large vehicle bump is prevented from occurring. In the present invention, in consideration of even this condition, the actuator assembly 300 is operated.

The present invention further includes a logic calculation part 200 to perform logic calculations for the vehicle velocity and steering angle determination part 110 and the vehicle velocity and steering angular velocity determination part 130 of the control part 100.

Preferably, both the vehicle velocity and steering angle determination part 110 and the vehicle velocity and steering angular velocity determination part 130 use an AND logic.

As such, because both the vehicle velocity and steering angle determination part 110 and the vehicle velocity and steering angular velocity determination part 130 use an AND logic, the control conditions of both the vehicle velocity and steering angle determination part 110 and the vehicle velocity and steering angular velocity determination part 130 can be simultaneously determined. Therefore, the actuator assembly 300 is appropriately operated according to the control conditions.

As shown in FIGS. 7 and 8, the actuator lever 310 of the actuator assembly 300 according to the present invention includes a body part 311 having a shaft hole 312 into which a hinge shaft 320 is inserted, and a yoke part 313 which is provided on the body part 311 while extending in a direction perpendicular to the body part 311. The actuator lever 310 further includes a bush mounting part 315 which extends from the body part 311 in a direction equal to that of the shaft hole 312.

The body part 311 has the shaft hole 312 to receive therein the hinge shaft 320.

The hinge shaft 320, which is inserted into the shaft hole 312, is coupled to a sub-frame (not shown) by a hinge.

The yoke part 313, which extends in a direction perpendicular to the body part 311, is coupled to a rod 331 of the actuator 330.

The bush mounting part 315 extends from the body part 311 in the same direction as that of the shaft hole 312.

That is, the bush mounting part 315 preferably extends outwards to a predetermined length from a predetermined portion of the body part 311 adjacent to the shaft hole 312, formed on the body part 311, in the same direction as that of the shaft hole 312.

A mounting bush 351 of the support link 350 is mounted to an end of the bush mounting part 315.

Preferably, a stud having a thread is provided on the end of the bush mounting part 315 to be inserted into the mounting bush 351.

In the actuator lever 310 of the present invention, because a distance between the hinge shaft 320 and the mounting bush 351 is relatively short, rotational inertia mass is reduced. Therefore, responsibility of the actuator 330 is superior, so that prompt control of the actuator assembly 300 is possible.

Furthermore, the bush mounting part 315 does not limit the length of the support link 350. Accordingly, the design of the actuator lever 310 of the present invention is not limited.

As described above, advantages of a method of controlling an actuator assembly according to the present invention are as follows.

First, the actuator assembly control method includes a step of obtaining both vehicle velocity and a steering angle, a step of determining whether both the input vehicle velocity and steering angle are in a preset advancing operation or retracting operation range, a step of advancing the actuator assembly when both the vehicle velocity and the steering angle are in the preset advancing operation range, and a step of retracting the actuator assembly when both the vehicle velocity and the steering angle are in the preset retracting operation range. The actuator assembly is set such that the actuator assembly retracting operation speed is slower than the actuator assembly advancing operation speed, thus preventing an inconsistent sensation from resulting from excessive variability of the geometry of the vehicle.

Furthermore, despite a large steering angle, if the vehicle velocity is low, the vehicle bump is prevented from occurring. Conversely, despite the high vehicle velocity, if the steering angle is small, the vehicle bump is prevented bump from occurring. In other words, the actuator assembly can be appropriately operated according to the driving state of the vehicle, thus reducing energy consumption, thereby increasing the efficiency of the actuator assembly.

Second, when the actuator assembly is retracted, if the actuator assembly has already been in a state, in which the stroke is retracted to half of the total stroke or more, in an early state, some problems may occur. Therefore, to prevent such problems, in the present invention, the actuator assembly is set such that the actuator assembly retracting operation speed is maintained at a constant value, thus linearly reducing the stroke of the actuator assembly as a function of time.

Third, the step of obtaining both the vehicle velocity and the steering angle may include a step of obtaining a steering angular velocity of the vehicle. The actuator assembly control method may further include a step of determining whether both the input vehicle velocity and the steering angular velocity are in the preset advancing operation range. Therefore, although the vehicle velocity is high and a desired steering angle is large, if a driver slowly steers the vehicle to change the direction, the vehicle makes a large turn. In this case, the large vehicle bump is prevented from occurring. In the present invention, in consideration of even this condition, the actuator assembly is operated.

Fourth, because both the step of determining the vehicle velocity and steering angle and the step of determining the vehicle velocity and steering angular velocity are performed by an AND logic, the control conditions of both the vehicle velocity and steering angle determination part and the vehicle velocity and steering angular velocity determination part can be simultaneously determined. Therefore, the actuator assembly is appropriately operated according to the control conditions.

Fifth, an actuator lever of the actuator assembly according to the present invention includes a body part having a shaft hole into which a hinge shaft is inserted, a yoke part coupled to an actuator and provided on the body part while extending in a direction perpendicular to the body part, and a bush mounting part extending from the body part in a direction equal to a direction of the shaft hole formed in the body pall, so that a mounting bush of a support link is mounted to the bush mounting part. In the actuator lever of the present invention having the above-mentioned construction, a distance between the hinge shaft and the mounting bush is relatively short. Therefore, rotational inertia mass is reduced, so that responsibility of the actuator is superior. As a result, prompt control of the actuator assembly is possible.

Furthermore, the bush mounting part does not limit the length of the support link. Accordingly, the design of the actuator lever of the present invention is not limited.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method of controlling an actuator assembly, comprising:
    obtaining both a vehicle velocity and a steering angle;
    determining whether both the input vehicle velocity and steering angle are in a preset advancing operation or retracting operation range;
    advancing the actuator assembly when both the vehicle velocity and the steering angle are in the preset advancing operation range; and
    retracting the actuator assembly when both the vehicle velocity and the steering angle are in the preset retracting operation range,
    wherein the actuator assembly is set such that an actuator assembly retracting operation speed is slower than an actuator assembly advancing operation speed.

2. The method as set forth in claim 1, wherein the actuator assembly is set such that the actuator assembly retracting operation speed is maintained at a constant value.

3. The method as set forth in claim 2, wherein the obtaining of both the vehicle velocity and the steering angle comprises: obtaining a steering angular velocity of the vehicle, the method further comprising:
    determining whether both the input vehicle velocity and the steering angular velocity are in the preset advancing operation range.

4. The method as set forth in claim 3, wherein the determination of the vehicle velocity and the steering angle and the determination of the vehicle velocity and the steering angular velocity are performed by an AND logic.

5. The method as set forth in claim 1, wherein the obtaining of both the vehicle velocity and the steering angle comprises: obtaining a steering angular velocity of the vehicle, the method further comprising:
    determining whether both the input vehicle velocity and the steering angular velocity are in the preset advancing operation range.

6. The method as set forth in claim 5, wherein the determination of the vehicle velocity and the steering angle and the determination of the vehicle velocity and the steering angular velocity are performed by an AND logic.

* * * * *